United States Patent [19]

Geisthoff

[11] Patent Number: 4,900,181
[45] Date of Patent: Feb. 13, 1990

[54] LOCKING DEVICE FOR CONNECTING A DRIVESHAFT TO A POWER TAKE-OFF SHAFT

[75] Inventor: Hubert Geisthoff, Lohmar, Fed. Rep. of Germany

[73] Assignee: Jean Walterscheid GmbH, Lohmar, Fed. Rep. of Germany

[21] Appl. No.: 304,660

[22] Filed: Jan. 31, 1989

[30] Foreign Application Priority Data

Feb. 1, 1988 [DE] Fed. Rep. of Germany ..... 38028492

[51] Int. Cl.⁴ .............................................. F16B 7/00
[52] U.S. Cl. .................................... 403/322; 403/325; 403/328; 403/316
[58] Field of Search ............... 403/322, 324, 325, 326, 403/327, 328, 359, 372, 316, 317, 318, 319

[56] References Cited

U.S. PATENT DOCUMENTS 4,639,163 1/1987 Buthe et al. ........................ 403/328
4,645,372 2/1987 Suzuki ................................. 403/328

Primary Examiner—Andrew V. Kundrat
Assistant Examiner—Carol I. Bordas
Attorney, Agent, or Firm—Toren, McGeady & Associates

[57] ABSTRACT

A locking device (6) for connecting a driveshaft (4) to a power take-off shaft (2) includes a coupling sleeve (7) mounted on the driveshaft in which locking members (12) are guided which lock the coupling sleeve against axial movement relative to the take-off shaft. A locking sleeve (14) is movable on the coupling sleeve (7) to lock the locking members (12) against movement or release them. A latch arrangement is provided to latch the locking sleeve in its release position during connection. The latch arrangement includes a stop (24) extending inwardly from the locking sleeve (14) and engageable with a stop (19) on the coupling sleeve (7) by tilting the locking sleeve on the coupling sleeve.

9 Claims, 2 Drawing Sheets

LOCKING DEVICE FOR CONNECTING A DRIVESHAFT TO A POWER TAKE-OFF SHAFT

BACKGROUND TO THE INVENTION

1. Field of the Invention

This invention is concerned with a locking device for connecting a driveshaft to a power take-off shaft, the invention finding a particular use in connecting a driveshaft for driving an agricultural implement to the power take-off shaft of a tractor.

Such a locking device comprises a coupling sleeve mounted on the driveshaft and arranged to slide on to the power take-off shaft, the coupling sleeve defining a plurality of radially-extending apertures, a plurality of locking members guided in the apertures of the coupling sleeve for inward movement to lock the coupling sleeve against axial movement relative to the power take-off shaft and outward movement to allow such axial movement, a locking sleeve on the coupling sleeve which may be moved between a locking position thereof in which it embraces the locking members and prevents outward movement thereof and a release position thereof in which the locking sleeve allows outward movement of the locking members, resilient biasing means operable to bias the locking sleeve into its locking position, and latch means operable to hold the locking sleeve in its release position and releasable by outward movement of the locking members as the coupling sleeve is slid on to the power take-off shaft.

2. Description of Prior Art

In U.S. patent specification No. 4639163 (equivalent to West German No. 33 45 732) a locking device is proposed in which the latch means comprises an additional sleeve provided with locking hooks arranged within the locking sleeve. After reaching a certain point in the axial movement of the locking sleeve, the locking hooks engage the apertures in which the locking members are guided, thereby preventing the locking sleeve from returning to its locking position. Such a return of the locking sleeve into its locking position would prevent coupling of the driveshaft to the power take-off shaft. The disadvantage of the latch means described in the aforementioned U.S. patent specification lies in the necessity to provide a number of additional components to provide the latch means complicating the design and increasing the risk of dirt or corrosion leading to a malfunction.

It is an object of the present invention to provide a locking device which has a simple design, consists of only a few components, and operates efficiently.

SUMMARY OF THE INVENTION

The invention provides a locking device for connecting a driveshaft to a power take-off shaft, the locking device comprising a coupling sleeve mounted on the driveshaft and arranged to slide on to the power take-off shaft, the coupling sleeve defining a plurality of radially-extending apertures, a plurality of locking members guided in the apertures of the coupling sleeve for inward movement to lock the coupling sleeve against axial movement relative to the power take-off shaft and outward movement to allow such axial movement, a locking sleeve on the coupling sleeve which may be moved between a locking position thereof in which it embraces the locking members and prevents outward movement thereof and a release position thereof in which the locking sleeve allows outward movement of the locking members, resilient biasing means operable to bias the locking sleeve into its locking position, and latch means operable to hold the locking sleeve in its release position and releasable by outward movement of the locking members as the coupling sleeve is slid on to the power take-off shaft, wherein the resilient biasing means acts between a first stop on the coupling sleeve adjacent to the apertures which guide the locking members and a second stop on the locking sleeve, and the latch means comprises a third stop on the coupling sleeve and a fourth stop on the locking sleeve which extends radially inwardly and, by tilting the locking sleeve on the coupling sleeve when the locking sleeve is in its release position, can be made to engage said third stop to thereby hold the locking sleeve in its release position.

In a locking device according to the last preceding paragraph, no special components are required for ensuring that the locking sleeve is latched in its release position because the locking sleeve, by means of said fourth stop, itself ensures latching by engaging said third stop on the coupling sleeve. There follows an eccentric displacement of the locking sleeve because, when contact is made between said third and fourth stops, the coupling sleeve tilts under the force of the resilient biasing means, which is conveniently provided by a spring. It is also ensured that the locking sleeve is safely held in the release position. When the coupling sleeve is slid on to the power take-off shaft, outward movement of the locking members releases the engagement between said third and fourth stops, thereby cancelling the latching, so that the locking sleeve can return to its locking position under the force of the resilient biasing means once the locking members have reached recesses provided for them in the power take-off shaft. As there is no need for any additional parts, which would for example be designed as sleeves and would be arranged so as to slide on the coupling sleeve, any dirt which may penetrate has no influence on the functioning of the device.

Preferably, said first and third stops on which are provided by opposite surfaces of an annular radially-outwardly directed ring on the coupling sleeve, thus further reducing the number of parts. This annular ring may be mounted in a groove of the coupling sleeve which projects into the region in which the radially-extending apertures are formed. This arrangement assists in limiting radially outward movement of the locking members.

The locking sleeve may comprise a locking ring of substantially L-shaped cross-section and a gripping sleeve, preferably with a thin wall, connected to the locking ring, and said fourth stop on the locking sleeve may be formed by a tab punched out from a circumferential face of the gripping sleeve and bent inwardly. This is a convenient and simple construction. The gripping sleeve may have a hole through its circumferential face to allow the locking sleeve to be removed or unfastened by providing access for a tool to be passed through the gripping sleeve. This hole has the additional advantage that any dirt or water which may have accumulated in the interior of the locking sleeve is ejected when the power take-off shaft and the driveshaft connected to it rotate.

The locking sleeve may be provided with a tilting projection to assist in tilting the locking sleeve by engaging a face of the coupling sleeve. This arrangement assists an operator in tilting the locking sleeve in the correct manner. The tilting projection may extend axially from an end face of the locking sleeve and said face of the coupling sleeve may be vertical. Alternatively, the tilting projection may extend radially inwardly from the locking sleeve and be engageable with an outer face of the coupling sleeve. Preferably the tilting projection lies in the same plane as the second said fourth stop on of the locking sleeve and both have only a small circumferential extent relative to the locking sleeve.

DESCRIPTION OF PREFERRED EMBODIMENTS

Figure 1:
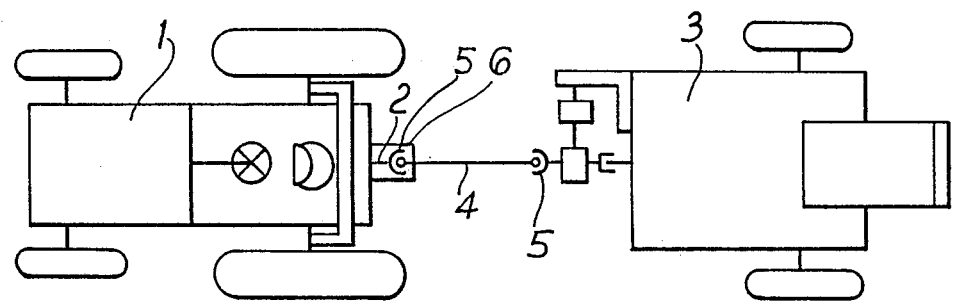
FIG. 1 is a schematic illustration of an agricultural implement driven by a tractor via a power take-off shaft.
Figure 2:
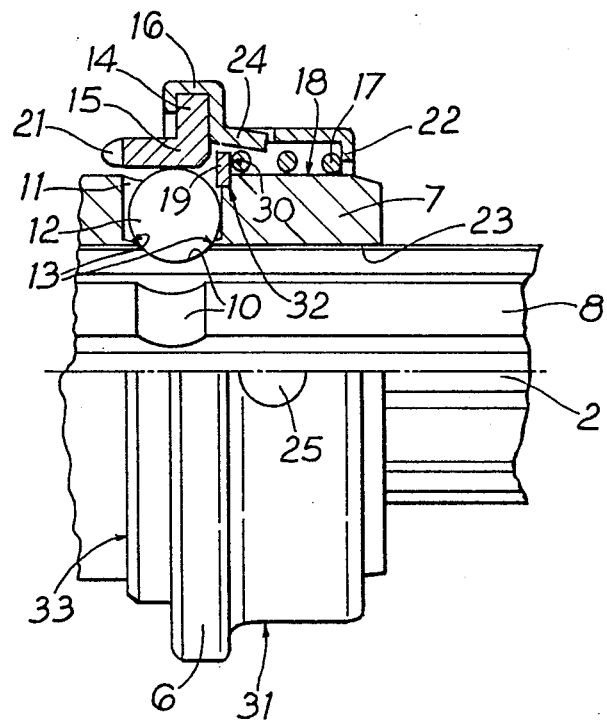
FIG. 2 is a longitudinal cross-section taken through a locking device according to the invention showing it in a coupled condition on the power take-off shaft.

The locking device shown in the drawings is for connecting a driveshaft 4 of an agricultural implement 3 to a power take-off shaft 2 of a tractor 1. The driveshaft 4 comprises two joints 5 and an intermediate shaft connecting the two joints. There is a torque connection between the driveshaft 4 and the power take-off 2 of the tractor 1. The locking device 6 has been provided to achieve this connection. The design and functioning of the locking device 6 are explained in detail in relation to FIGS. 2 and 3. The locking device 6, however, essentially consists of a coupling sleeve 7 which, for example, may be part of the joint yoke of the joint 5, a locking sleeve 14 and locking members 12.

The outer face of the power take-off shaft 2 is provided with a multi-spline profile 8 which matches a multi-spline profile 9 provided in a bore 23 in the coupling sleeve 7. The coupling sleeve 7 is thus mounted on the drive shaft 4 and arranged to slide on to the power take-off shaft 2. The coupling sleeve 7 defines a plurality of radially-extending apertures 11 which are circumferentially distributed, in this case there are three such apertures. A plurality of locking members 12, in this case three, are guided in the apertures 11 of the coupling sleeve 7 for inward movement to lock the coupling sleeve 7 against axial movement relative to the power take-off shaft 2 and outward movement to allow such axial movement. The locking members 12 are in the form of balls but may have any suitable shape. The apertures 11, at their radially inner end, which enters the bore 23, are provided with radial projections 13 which prevent the locking members 12 from falling out in the event that the driveshaft 4 is not on the take-off shaft 2. The apertures 11 and locking members 12 are arranged in such a way that, in the coupled condition, they correspond to raised spline faces of the multi-spline profile 8 of the power take-off shaft 2 and so that they may engage in recesses 10 in said raised spline faces of the multi-spline profile 8. In the coupled condition, i.e. in the condition illustrated in FIG. 2, the radial movement of the locking members 12 outwardly is limited by the locking sleeve 14, i.e. the locking members 12 are locked in the recesses 10 and as a result relative axial movement of the power take-off shaft 2 and the coupling sleeve 7 is not possible.

The locking sleeve 14 is mounted on the coupling sleeve 7 and may be moved between a locking position thereof (shown in FIG. 2) in which it embraces the locking members 12 and prevents outward movement thereof and a release position thereof (shown in FIG. 3) in which the locking sleeve allows outward movement of the locking members 12.

The locking sleeve 14 is formed in two parts, comprising a locking ring 15 of substantially L-shaped cross-section and a gripping sleeve 16 made of sheet metal. The locking ring 15 is received in the gripping sleeve 16 which comprises a groove in which the locking ring is fixed by knurling one edge of the gripping sleeve 16.

The locking device 6 also comprises resilient biasing means in the form of a spring 17 which is operable to bias the locking sleeve 14 into its locking position. The spring 17 surrounds the outer surface 18 of the coupling sleeve 7 and acts between a first stop 30 on the coupling sleeve 7 adjacent to the apertures 11 which guide the locking members 12 and a second stop 22 formed by an inwardly-facing web at one end of the gripping sleeve 16. To provide the first stop 30, the outer face of the coupling sleeve 7 is provided with a groove 32 which projects into the region of the apertures 11 and into which a securing ring 19 is inserted, one annular face of which serves as the first stop 30. The securing ring 19 is accessible via an aperture 25 in the circumferential face 31 of the gripping sleeve 16 of the locking sleeve 14. While the driveshaft 4 is rotating, this aperture 25 simultaneously serves to remove any dirt or water which may have accumulated in the interior of the locking device 6. Motion of the locking sleeve 14 under the influence of the spring 17 is limited by engagement between the locking ring 15 and a third stop 29 formed by the other annular faces of the securing ring 19.

The locking device 7 also comprises latch means operable to hold the locking sleeve 14 in its release position and releasable by outward movement of the locking members 12 as the coupling sleeve 7 is slid on to the power take-off shaft 2. The latch means comprises a fourth stop 24 provided on the locking sleeve 14 which extends radially inwardly and, by tilting the locking sleeve 14 on the coupling sleeve 7 when the locking sleeve is in its release position, can be made to engage the third stop 29 on the coupling sleeve 7 to thereby hold the locking sleeve 14 in its release position. The fourth stop 24 is produced by punching out a tab from the circumferential face 31 of the gripping sleeve 16 and bending it so that it will come to rest against the third stop 29 of the securing ring 19, this condition being shown in FIG. 3. Thus, the first stop 30 on the coupling sleeve 7 on which the spring 17 acts and the third stop on the coupling sleeve 7 which is engageable by the fourth stop 24 of the locking sleeve 14 are provided by opposite sides of the securing ring 19.

Figure 3:
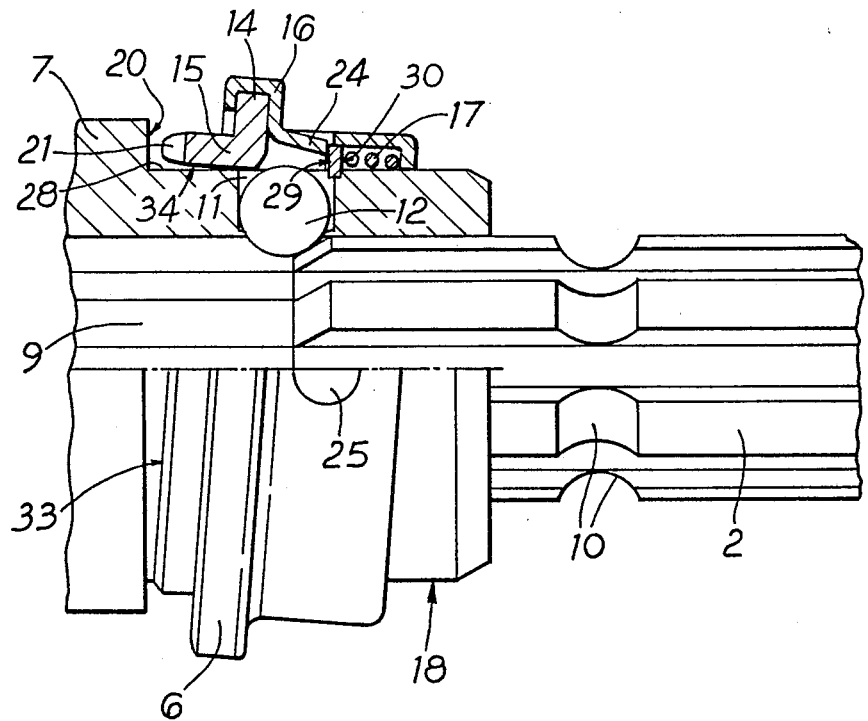
FIG. 3 is a view similar to FIG. 2 but showing the locking device in a condition in which the coupling sleeve thereof is being slid on to the power take-off shaft of a tractor.

As shown in FIG. 3, when the coupling sleeve 7 is not yet or not fully engaged with the power take-off shaft 2, the locking sleeve 14 has been moved manually into its release position, i.e. away from the power take-off shaft 2, so that the fourth stop 24 has moved over the radially outer contour of the securing ring 19 and by engaging behind the annular ring 19 the fourth stop 24 comes to rest against the third stop 29. As a result of the force of the spring 17, the locking sleeve 14 is slightly tilted relative to the locked position shown in FIG. 2. This at the same time ensures the release position of the locking sleeve 14. To facilitate the transfer of the locking sleeve 14 into such a position a tilting projection 21 is provided on the locking sleeve 14 which cooperates with a projection face 20 provided on the coupling sleeve 7. The tilting 21 is provided to assist in tilting the locking sleeve 14 by engaging the face 20. The tilting projection 21 extends axially from an end face of the locking sleeve to its engagement with the vertically-extending face 20. Alternatively, the tilting projection may be constructed to extend radially-inwardly into a bore 34 of the locking sleeve 14 and be engageable with an outer face of the coupling sleeve 7. The tilting projection 21 is designed to make point contact with the face 20 and extends from the end face 33 of the locking sleeve 14 in the same plane as the fourth stop 24 of the locking sleeve 14. Both the tilting projections 21 and the fourth stop 24 extend around the locking sleeve 14 through only a small circumferential extent.

If the locking sleeve 14 is operated in the release direction, i.e. if it is moved towards the face 20, the tilting projection 21 first comes to rest against the face 20 and if a further force is applied, the locking sleeve 14 is necessarily tilted, i.e. it assumes an inclined position as illustrated in FIG. 3, so that the fourth stop 24 comes to rest against the third stop 29 of the securing ring 19. If, starting from the position as illustrated in FIG. 3, the coupling sleeve 7 is continued to be slid on to the power take-off shaft 2 in the direction of the recesses 10 in the power take-off shaft, the locking members 12 ensure that the locking sleeve is re-aligned into the locking position by sliding along the external surface 28 of the coupling ring 7, with the fourth stop 24 being moved clear of the securing ring 19 by one of the locking members 12, with the locking sleeve 14 and, due to the force of the spring 17, being moved in the direction of the apertures 11 when the locking members 12 and the recesses 10 have reached corresponding positions, and with its inner surface preventing the locking members 12 from escaping radially outwardly. As a result of the special arrangement of the securing ring 19, i.e. because it projects into the region of the apertures 11, the locking members 12 are also prevented from leaving the apertures 11 and falling radially outwardly. The radially outward movement of the locking members 12 is thus limited.

I claim:

1. A locking device for connecting a driveshaft to a power take-off shaft, the locking device comprising:
   a coupling sleeve mounted on the driveshaft and arranged so as to slide on the power take-off shaft, said coupling sleeve defining a plurality of radially-extending apertures;
   a plurality of locking members guidable in the apertures for inward movement so as to lock said coupling sleeve against axial movement relative to the power take-off shaft and outward movement to allow such axial movement;
   a locking sleeve on said coupling sleeve which is movable between a locking position thereof in which it embraces said locking members so as to prevent outward movement thereof and a release position thereof in which said locking sleeve allows outward movement of said locking members;
   resilient biasing means for biasing said locking sleeve into the locking position; and
   latch means operable for holding said locking sleeve in the release position and releasable by outward movement of said locking members as said coupling sleeve is slid on to the power take-off shaft, said resilient biasing means acting between a first stop on said coupling sleeve adjacent to the apertures and a second stop on said locking sleeve, and said latch means including a third stop on said coupling sleeve and a fourth stop on said locking sleeve and which extends radially inwardly and, by tilting said locking sleeve on said coupling sleeve when said locking sleeve is in the release position, engages with said third stop to thereby hold said locking sleeve in the release position.

2. A locking device according to claim 1, wherein said first and third stops are provided by opposite surfaces of a radially-outwardly extending ring on said coupling sleeve.

3. A locking device according to claim 2, wherein said ring is mounted in a groove in said coupling sleeve which extends into the region of the apertures.

4. A locking device according to claim 1, wherein said locking sleeve comprises a locking ring of substantially L-shaped cross-section and a gripping sleeve connected to said locking ring, fourth stop being formed by a tab punched out from a circumferential face of said gripping sleeve and bent inwardly.

5. A locking device according to claim 4, wherein said gripping sleeve has a hole through its circumferential face 6. A locking device according to claim 1, wherein said locking sleeve is provided with a tilting projection to assist in tilting said locking sleeve by engaging a face on said coupling sleeve when said locking sleeve is in said release position.

7. A locking device according to claim 6, wherein said tilting projection extends from an end face of said locking sleeve, said face of said coupling sleeve being vertical.

8. A locking device according to claim 6, wherein said tilting projection extends radially inwardly from said locking sleeve and is engageable with an outer face of said coupling sleeve.

9. A locking device according to claim 6, wherein said tilting projection lies in the same plane as said fourth stop.

* * * * *